United States Patent [19]
Kawabe et al.

[11] Patent Number: 5,961,565
[45] Date of Patent: Oct. 5, 1999

[54] WHEEL DRIVE TORQUE CONTROLLER

[75] Inventors: Taketoshi Kawabe; Osamu Isobe; Masao Nakazawa; Ikurou Notsu; Sadahiro Takahashi, all of Ageo, Japan

[73] Assignee: Nissan Diesel Motor Co., Ltd., Ageo, Japan

[21] Appl. No.: 08/716,710

[22] Filed: Sep. 12, 1996

[30] Foreign Application Priority Data

Sep. 14, 1995 [JP] Japan .................................. 7-273377

[51] Int. Cl.⁶ .................................................. B60K 31/00
[52] U.S. Cl. .............................. 701/90; 701/84; 180/197
[58] Field of Search .............................. 701/70, 74, 82, 701/83, 84, 85, 86, 90; 180/197

[56] References Cited

U.S. PATENT DOCUMENTS

| | | | |
|---|---|---|---|
| 4,985,836 | 1/1991 | Hashiguchi et al. | 701/90 |
| 4,985,838 | 1/1991 | Hashiguchi et al. | 701/90 |
| 5,151,861 | 9/1992 | Danno et al. | 701/90 |
| 5,243,526 | 9/1993 | Ito et al. | 701/90 |
| 5,245,542 | 9/1993 | Ito et al. | 180/197 |
| 5,255,192 | 10/1993 | Ito et al. | 180/197 |

OTHER PUBLICATIONS

H. Tan et al., "Vehicle Traction Control: Variable–Structure Control Approach", Journal of Dynamic Systems, Measurement, and Control, vol. 113, Jun. 1991, 223–230.

Y. Chin et al., "Sliding–Mode ABS Wheel–Slip Control", Control Conf. 1/5 1992.

*Primary Examiner*—Gary Chin
*Attorney, Agent, or Firm*—Foley & Lardner

[57] ABSTRACT

A drive torque of a vehicle drive wheel is controlled so that a slip ratio between the drive wheel and a road surface is equal to a target value. A determining function of which the sign varies when the slip ratio is equal to the target value, and a switching function comprising a time integral of the determining function, are set, and the drive torque target value is set such that it is directly proportional to the switching function. Alternatively, the drive torque target value is set based on the switching function which is set equal to the determining function and corrected based on an angular acceleration of the drive wheel.

6 Claims, 8 Drawing Sheets

WHEEL DRIVE TORQUE CONTROLLER

FIELD OF THE INVENTION

This invention relates to optimization of a wheel drive torque when a vehicle starts or accelerates.

BACKGROUND OF THE INVENTION

Feedback control of a drive wheel drive torque based on a difference between wheel speed and chassis speed such that the drive wheel does not slip excessively when a vehicle starts or accelerates is disclosed for example in the following references.

(1) Tan and Chin: Vehicle Traction Control: Variable Structure Control Approach. Trans. of ASME Dynamic Systems, Measurement and Control, 113 223/230 (1991)

(2) Chin, William, Sidlosky, Rule and Sparschu: Sliding-Mode ABS Wheel-Slip Control Proc. of Am. Control Conf. 1/5 (1992)

In the devices described in these references, a function having vehicle speed and wheel speed as arguments is set, and the slip ratio between the road surface and a tire is controlled to a target value by changing over a drive torque according to whether the value of the function is positive or negative.

However, if there is oscillation of the drive torque in this device due to a response delay with respect to a throttle operation of the engine which generates the drive torque, it may not reach a desired value.

The control device moreover comprises a digital processor. When the chassis speed and wheel speed are sampled with a limited sampling interval, a response delay occurs in the control of drive torque due to the time required for calculation of the function, and oscillation of the drive torque or slip ratio tends to occur.

To suppress such an unfavorable oscillation, the characteristics of the function may be set so that there is no sudden change-over of drive torque, and the drive torque varies smoothly from a maximum value to a minimum value. However when the drive torque is varied intermittently in this way, the control error increases, and the target value may not correspond precisely with the actual value of the slip ratio.

SUMMARY OF THE INVENTION

It is therefore an object of this invention to make a slip ratio between a road surface and a tire converge rapidly to a target value.

It is a further object of this invention to increase the control precision of a slip ratio.

In order to achieve the above objects, this invention provides a wheel drive torque controller comprising a sensor for detecting a drive wheel speed, a sensor for detecting a vehicle speed, a controller configured to calculate a drive wheel slip ratio from the drive wheel speed and the vehicle speed, set a determining function which takes a positive value when said wheel slip ratio is less than a predetermined target value, and which takes a negative value when said wheel slip ratio is larger than the predetermined target value, set a switching function comprising a time integral of the determining function, and determine a drive torque target value according to the value of the switching function, and a drive torque generating mechanism for generating a drive torque of the drive wheel corresponding to the drive torque target value.

It is preferable that the determining function, the switching function and the wheel slip ratio are respectively defined by the following Equations (A), (B) and (C):

$$\sigma(t) = \eta \cdot x_v(t) + x_w(t) \qquad \text{Equation (A)}$$

where:

$\eta = \lambda_O - 1$ $\sigma(t)$: determining function $x_v(t)$: vehicle speed $x(t)$: drive wheel speed ?$\lambda_O$: target slip ratio $$s(t) = \sigma(t) + k_i \cdot \int_{t0}^{t} \sigma(t) dt \qquad \text{Equation (B)}$$

where:

$s(t)$: switching function $k_i$: constant $$\lambda = \frac{x_v(t) - x_w(t)}{x_v(t)} \qquad \text{Equation (C)}$$

where, $\lambda$: wheel slip ratio.

It is further preferable that the drive torque target value is determined by the following Equation (D):

$$u_{cmd}(t) = J_w \cdot q(t) \qquad \text{Equation (D)}$$

where:

$$q(t) = \begin{cases} q^+ & s(t) > \delta \\ f(s) & 0 \le s(t) \ge \delta \\ q^- & s(t) \le 0 \end{cases}$$

$s(t)$: switching function $J_w$, $q^+$, $q^-$, $\delta$: constants $u_{cmd}(t)$: drive torque target value $f(s)$: monotonic decreasing function, $f(o) = q^-$, $f(\delta) = q^+$ This invention also provides a wheel drive torque controller comprising a sensor for detecting a drive wheel speed of a drive wheel, a sensor for detecting a vehicle speed, a sensor for detecting a wheel angular acceleration, a controller configured to calculate a drive wheel slip ratio from the drive wheel speed and the vehicle speed, set a switching function which takes a positive value when the wheel slip ratio is less than a predetermined target value, and which takes a negative value when the wheel slip ratio is larger than the predetermined target value, determine a drive torque target value according to the value of the switching function, and correct the drive torque target value by a correction value according to the wheel angular acceleration, and a torque generating mechanism for generating a drive torque of the drive wheel corresponding to a corrected drive torque target value.

It is preferable that the switching function and the wheel slip ratio are respectively defined by the following Equations (E) and (F):

$$s(t) = \eta \cdot x_v(t) + x_w(t) \qquad \text{Equation (E)}$$

where:

$\eta = \lambda_O - 1$ $s(t)$: switching function $x_v(t)$: vehicle speed $x_w(t)$: drive wheel speed $\lambda_O$: target slip ratio $$\lambda = \frac{x_v(t) - x_w(t)}{x_v(t)} \qquad (F)$$

wherein:

$\lambda$: wheel slip ratio

It is also preferable that the drive torque target value is determined by the following Equation G:

$$u_{cmd}(t) = J_w \{v(t) - k_w \cdot \dot{x}_w\} \qquad \text{Equation G}$$

where:

$$v(t) = \begin{cases} v^+ & s(t) > 0 \\ v^- & s(t) < 0 \end{cases}$$

$s(t)$: switching function $J_w$, $v^+$, $v^-$, $k_w$: constants $\dot{x}_w$: drive wheel angular acceleration $u_{cmd}(t)$: drive torque target value The details as well as other features and advantages of this invention are set forth in the remainder of the specification and are shown in the accompanying drawings.

DETAILED DESCRIPTION OF THE PREFERRED EMBODIMENT

Figure 1:
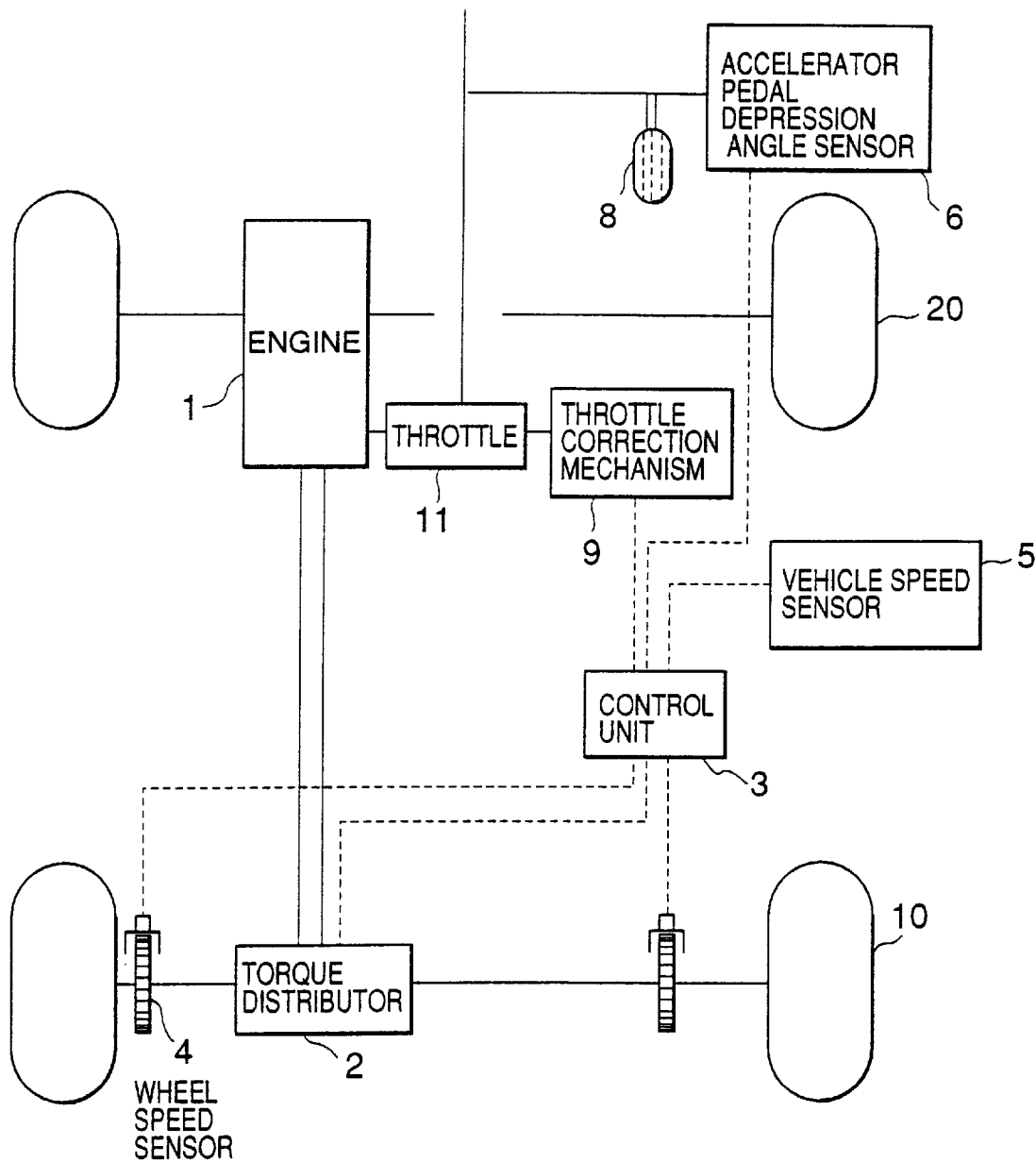
FIG. 1 is a schematic diagram of a drive torque controller according to a first embodiment of this invention.

Referring to FIG. 1 of the drawings, an engine 1 varies an output torque according to an aperture of an air intake throttle 11. The output torque is transmitted to left and right wheels 10 via a torque distributor 2 which distributes the torque in response to an output signal of a control unit 3 so as to rotate the drive wheels 10. Opening and closing of the air intake throttle is performed by an accelerator pedal 8.

Signals are input to the control unit 3 from a wheel speed sensor 4 which detects the rotation speed $x_w(t)$ of the wheels 10, a vehicle speed sensor 5 which detects the vehicle speed $x_v(t)$ of the automobile, and an accelerator pedal depression angle sensor 6 which detects a depression angle $\theta(t)$ of the accelerator pedal 8.

The wheel speed sensor 4 is provided for each of the drive wheels 10.

The vehicle speed sensor 5 comprises for example an acceleration sensor which detects an acceleration $\alpha$ acting on the vehicle in a forward/backward direction, and an integrator which integrates the output of the sensor 5.

Alternatively, the vehicle speed $x_v(t)$ may be calculated from the following equation in the control unit 3:

$$x_v(t) = x_v(t_0) - \frac{1}{R_W} \cdot \int_{t_0}^{t} \alpha \cdot dt$$

where, $x_v(t_0)$ is an initial value, $R_W$ is a wheel radius.

A wheel speed sensor may also be installed on a non-drive wheel 20 so as to detect the rotation speed of the non-drive wheel 20 as the vehicle speed $x_v(t)$.

The control unit 3 may for example comprise a microcomputer which calculates a target drive torque $u_{cmd}(t)$ from the following equations with respect to the input drive wheel speed $x_w(t)$, vehicle speed $x_v(t)$ and accelerator pedal depression angle $\theta(t)$ signals.

$$\sigma_i(t) = \eta \cdot x_v(t) + x_{wi}(t) \qquad (1)$$

where, i is a suffix indicating the wheel number.

For example, when the drive wheels are the two rear wheels, let the wheel speed of the right rear wheel be $x_{w1}(t)$ and the wheel sped of the left rear wheel be $x_{w2}(t)$. A determining function $\sigma_i$ is calculated for each drive wheel.

$\sigma$ is a predetermined value which is determined by the following equation from a target value $\lambda_o$ of the slip ratio between the road surface and the tires:

$$\sigma = \lambda_o - 1$$

The slip ratio $\lambda_i$ between the road surface and tires is determined from the following equation:

$$\lambda_i = \frac{x_{w_i}(t) - x_v(t)}{x_{w_i}(t)} \qquad (2)$$

By definition, $\sigma_i(t) = 0$ means that the slip ratio $\lambda_i$ coincides with the slip ratio $\lambda_o$. $\sigma_i(t) > 0$ means that the slip ratio is larger than the target value, while $\sigma_i(t) < 0$ means that the slip ratio is less than the target value.

Next, a switching function $s_i(t)$ is calculated using the following equation:

$$s_i(t) = \sigma_i(t) + k_I \cdot \int_{t_0}^{t} \sigma_i(t) dt \qquad (3)$$

where, t is the present time, and $k_I$ is a predetermined positive constant.

The drive torque value $u_{cmd}(t)$ of the drive wheels 10 is determined by the following equations:

$$u_{cmdi}(t) = J_w \cdot q_i(t) \qquad (4)$$

$$q_i(t) = \begin{cases} q_i^+ & s_i(t) > \delta \\ f(s_i) & 0 \leq s_i(t) \leq \delta \\ q_i^+ & s_i(t) > \delta \end{cases} \qquad (5)$$

$f(s_i)$ is a smoothly monotonic decreasing function which satisfies $f(o) = q_i^-$, $f(\delta) = q_i^+$, $\delta$ is a positive predetermined value. $q_i^+$, $q_i^-$ are constants which satisfy the following conditions:

$$q_i^+ < f_{resist_i} - \sigma \cdot \dot{x}_v(t) - f_{\mu i} - k_I \cdot \sigma_i(t) \quad (6)$$

$$q_i^+ < f_{resist_i} - \sigma \cdot \dot{x}_v(t) - f_{\mu i} - k_I \cdot \sigma_i(t) \quad (7)$$

$f_{\mu i}$ is a force in the forwards/backwards direction exerted by the road surface on the ith wheel, and $f_{resist_i}$ is the rolling resistance of the ith wheel.

Figure 4:
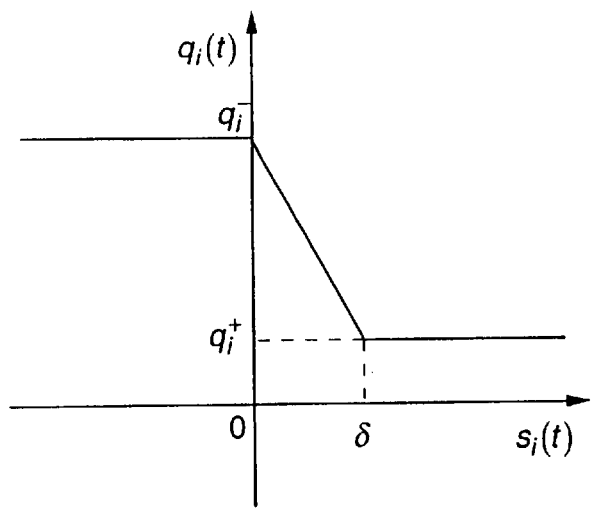
FIG. 4 is a graph showing the characteristics of a function $q_i(t)$ applied by the controller.

$f_{\mu i}$, $f_{resist_i}$, $\dot{x}_v$, $\sigma_i$ always have finite values, so there are always values of $q_i^+$, $q_i^-$ which satisfy equations (6) and (7). FIG. 4 expresses $q_i(t)$ in graphical form.

Hence, an opening correction amount of the air intake throttle 11 required to obtain the target drive torque $u_{cmd_i}(t)$ is calculated from the accelerator pedal depression angle $\theta(t)$, and a correction signal is output to a throttle correction mechanism 9.

The throttle correction mechanism 9 is attached to the air intake throttle 11, and corrects the opening of the throttle 11 according to a correction signal.

The above calculation and control performed by the control unit 3 will now be described using the flowcharts of FIGS. 2 and 3.

Figure 2:
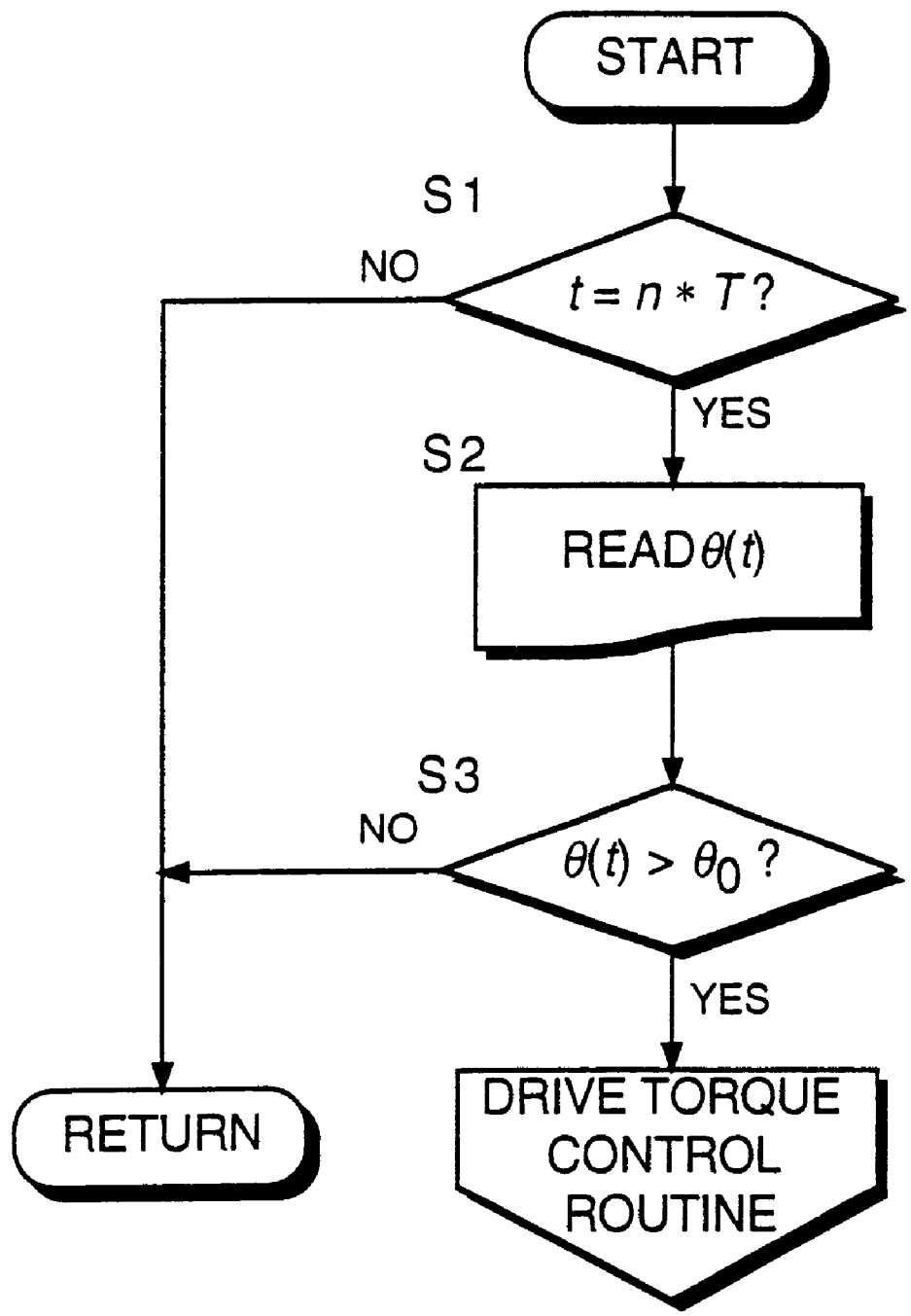
FIG. 2 is a flowchart describing a process performed by the controller for determining whether drive torque control conditions are established.

The flowchart of FIG. 2 is a basic routine. In a step S1, it is determined whether or not the time is a sampling time. This step is provided so that the routine is executed with a fixed period. Specifically, it is determined whether or not a counter value t of the present time is equal to n times (where n=integer) a sampling period T, and the routine of a step S2 and subsequent steps is executed only when it is equal.

In the step S2, the depression angle $\theta(t)$ of the accelerator pedal is read, and in a step S3 it is determined whether or not $\theta(t)$ is equal to or greater than a predetermined value $\theta_0$. In general, slip during acceleration occurs when the accelerator pedal has been depressed by a certain amount or more. At other times, drive force control is not necessary, so the routine terminates without performing drive force control.

Figure 3:
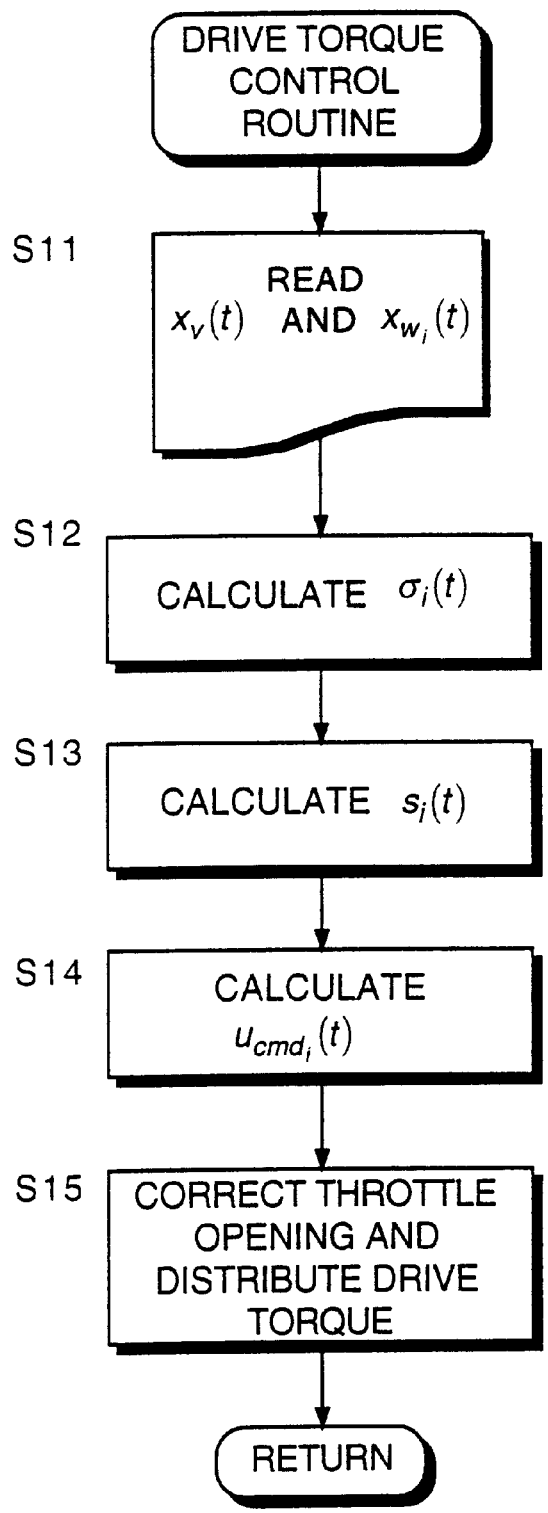
FIG. 3 is a flowchart describing a drive torque control routine performed by the controller.

When the depression angle $\theta(t)$ is equal to or greater than $\theta_0$, the drive force control routine shown in FIG. 3 is executed.

Herein, in a step S11, the drive wheel speed $x_{w_i}(t)$ and vehicle speed $x_v(t)$ are read. Next, in steps S12–S14, the calculations (1)–(7) are performed, and the drive torque $u_{cmd_i}(t)$ for each wheel is calculated.

Next, in a step S15, the throttle opening is corrected so that the engine torque $T_E$ coincides with the following equation:

$$T_E = k_G \cdot \sum_{i=1}^{\eta_w} u_{cmd_i}$$

where, $k_G$ is a gear ratio corresponding to $$\frac{engine\_torque}{drive\_torque\_of\_drive\_wheels},$$

and $\eta_w$ is the number of the drive wheels. To execute the routine simply, the throttle opening may be arranged to be directly proportional to $$\sum_{i=1}^{\eta_w} u_{cmd_i}.$$

When $\eta_w=2$, torque distributor 2 divides the engine torque $T_E$ between the left and right drive wheels in the proportion of $u_{cmd_1} : u_{cmd_2}$.

When the number of drive wheels of the vehicle is $\eta_w$, the acceleration equations of motion may be expressed as follows:

$$\dot{x}_v(t) = -c_1 \cdot \sum_{i=1}^{\eta_w} f_{\mu i} - f_{aero} - c_1 \cdot \sum_{i=1}^{\eta_w} f_{resist_i} + f_g \quad (8)$$

$$\dot{x}_w(t) = f_{\mu i} - f_{resist_i} + q_i(t) \quad (9)$$

$(x_v > 0, x_{W_i} > 0)$
where, $$f_{\mu i} = \frac{R_W}{J_W} \cdot F_{v_i} \cdot \mu_i(\lambda_i)$$

$$f_{resist_i} = \frac{R_W}{J_W} \cdot F_{v_i} \cdot B_{r_i}$$

$$f_{aero} = \frac{R_W}{J_W} \cdot B_V \cdot x_v^2$$

$$f_g = g \cdot \frac{\sin(\theta)}{R_W}$$

$$q_i(t) = \frac{1}{J_W} \cdot u_i$$

$$c_1 = \frac{J_W}{R_W^2 \cdot M_v}$$

$$\lambda_i = \frac{x_v(t) - x_{W_i}(t)}{x_v(t)}$$

$x_v$: vehicle speed (converted from rotation angular speed)
$u_i$: acceleration moment of ith wheel
$B_V$: air resistance coefficient
$J_W$: inertial moment of drive wheels
$\mu_i(\lambda_i)$: frictional coefficient between ith wheel and road surface
$F_{v_i}$: wheel load of ith drive wheel
$\theta$: road surface inclination
$x_{w_i}$: rotation speed of ith drive wheel
$M_v$: vehicle mass
$B_{r_i}$: rolling resistance coefficient of ith wheel
$R_w$: radius of drive wheels
$\lambda_i$: slip ratio of ith wheel
$\eta_w$: number of drive wheels Now, let us consider the quantity $V_i(t) = s_i(t)^2$. By definition, it is clear that $V_i(t) \geq 0$. If the time differential $\dot{V}_i(t)$ is always $\dot{V}_i(t) \leq 0$, $V_i(t)$ decreases monotonously, i.e.:

$$\lim_{t \to \infty} V_i(t) = C(\text{constant})$$

and $s_i(t)$ is also a constant value. By definition, if $s_i(t)$ is constant, $\sigma(t)=0$, i.e. $\lambda_i = \lambda_0$.

Let us determine the conditions under which $\dot{V}_i(t)$ is always $\dot{V}_i(t) \leq 0$. Since $\dot{V}_i(t) = 2 \cdot \dot{s}_i(t) \cdot s_i(t) \leq 0$, $\dot{s}_i(t) < 0$ when $s_i(t) \geq 0$ and $\dot{s}_i(t) \geq 0$ when $s_i(t) \leq 0$. First, consider the case $s_i(t) < 0$. Writing out $\dot{s}_i(t)$:

$$\dot{s}_i(t) = \eta \dot{x}_v(t) + \dot{x}_{wi}(t) = k_I \cdot \sigma_i(t) \quad (10)$$

$$= \eta \cdot \dot{x}_v(t) + f_{\mu i} - f_{resist_i} + q_i(t) + k_i \cdot \sigma_i(t)$$

Substituting $q_i(t)$ of Equation (5) in Equation (10), it is easily seen that $\dot{s}_i(t) > 0$. Similarly, for $\dot{s}_i(t) > \delta$, it is easily seen that $\dot{s}_i(t) < 0$.

Figure 5:
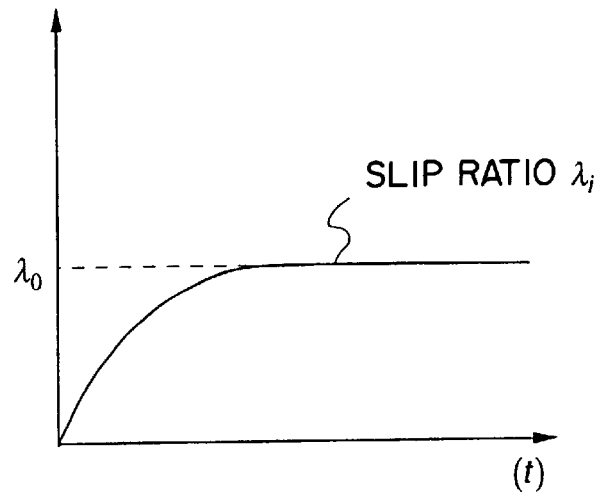
FIG. 5 is a graph of a slip ratio $\lambda$ under the control of the controller.
Figure 6:
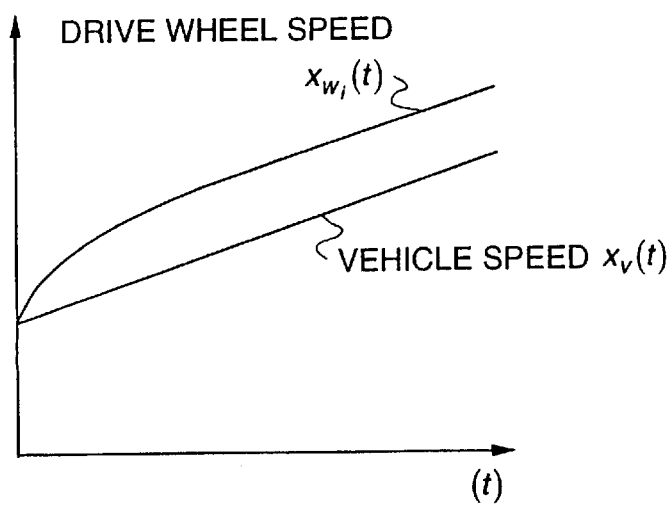
FIG. 6 is a graph showing the relation between a drive wheel speed $x_{wi}$, and chassis speed $x_v$ under the control of the controller.

It is clear from Equation (10) that in the range $0 \leq s_i(t) \leq \sigma$, there is an equilibrium point P for which $s_i(t)=0$ at $q_i(t)=u_{i0}$ ($q_i^- > u_{i0} > q_i^+$). Hence for $s_i(t)<0$ and $s_i(t)>\delta$, $V_i(t)$ decreases monotonously, and at the point P in the range $0 \leq s_i(t) \leq \delta$, $V_i(t)$ is stable. This means that $\lambda_i = \lambda_0$. In this way, the slip ratio $\lambda_i$ is precisely controlled to the target value $\lambda_0$ in a short time as shown in FIG. 5. Further, the vehicle speed $x_v$ follows the drive wheel speed $x_{wi}$ with a constant speed difference corresponding to the slip ratio $\lambda_0$ as shown in FIG. 6.

Effective, stable acceleration may therefore be achieved by providing an integral term in the change-over function.

Figure 7:
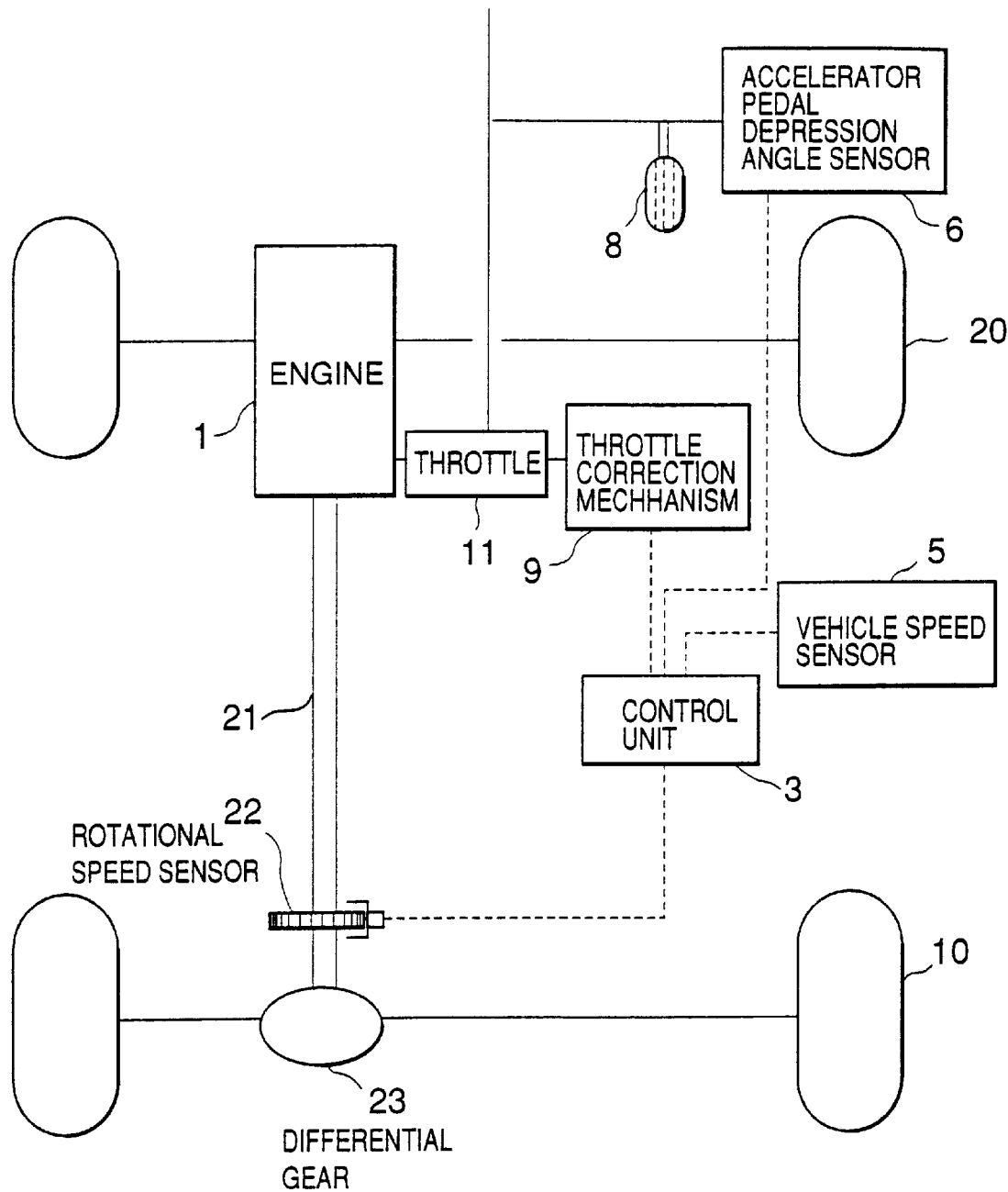
FIG. 7 is similar to FIG. 1, but showing a second embodiment of this invention.

FIG. 7 shows a second embodiment of the invention wherein the construction of the above embodiment has been simplified.

This embodiment is applied to a vehicle having a differential gear 23 instead of the torque distributor 2. Here, a rotation speed sensor 22 is fitted to the propeller shaft 21 instead of fitting the wheel speed sensor 4 to each of the drive wheels 10, and an average value $x_{w_1}$ of the drive wheel speed is calculated from the rotation speed of the propeller shaft 21 for $\eta_{w_1}=1$.

$$x_{w_1} = K_p \cdot N_p$$

where, $K_p$ is a gear ration corresponding to $$\frac{drive\_wheel\_speed}{propeller\_shaft\_rotation\_speed}.$$

According to this embodiment, torque distribution to the left and right wheels 10 is performed by the differential gear 23 according to the load, and the control unit 3 controls only the throttle opening.

Figure 8:
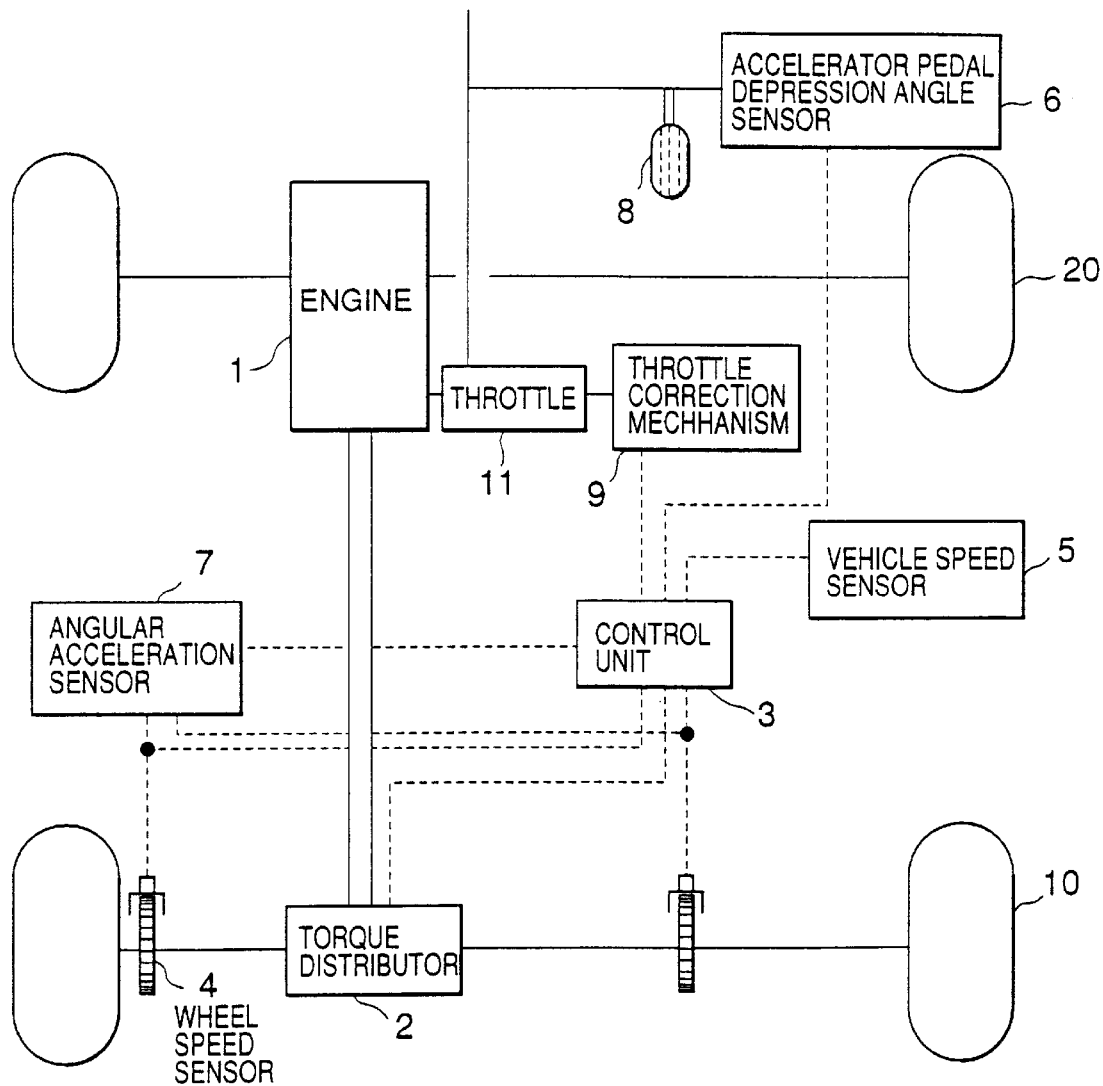
FIG. 8 is similar to FIG. 1, but showing a third embodiment of this invention.
Figure 9:
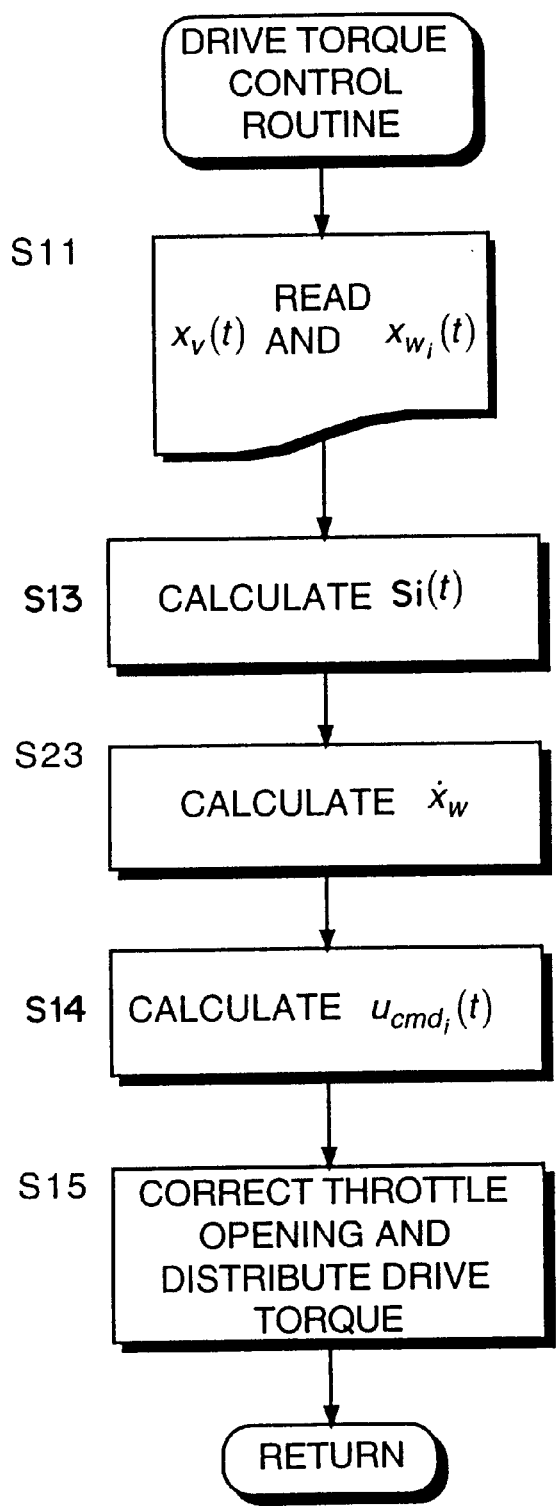
FIG. 9 is a flowchart showing a drive torque control routine according to the third embodiment.

FIGS. 8, 9 shows a third embodiment of this invention. According to this embodiment, an angular acceleration sensor 7 which detects the angular acceleration of each drive wheel 10 is added to the construction of the first embodiment, and the angular acceleration $\dot{x}_w$ of each drive wheel 10 is fed back into the calculation of the drive torque target value $u_{cmdi}(t)$ for each drive wheel 10. The basic drive force control routine is the same as the flowchart of the first embodiment shown in FIG. 2, however regarding the calculation of the drive force target value $u_{cmdi}(t)$, the steps S12, S13 of the first embodiment are replaced respectively by steps S13, S23 as shown in FIG. 9.

In the step S13, the switching function $s_i(t)$ is set to be equal to the determining function $\sigma_i(t)$ as expressed by the following equation.

$$s_i(t) = \cdot x_v(t) + \dot{x}_w(t)$$

In the step S23, the angular acceleration $x_{wi}(t)$ of the drive wheels is read from the output of the angular acceleration sensor 7, and in the step S24, the drive torque target value $u_{cmdi}(t)$ is calculated from the following equations:

$$u_{cmdi}(t) = J_w \cdot q_i = J_w \{v_i(t) - k_w \cdot \dot{x}_{wi}\} \qquad (11)$$

$$v_i(t) = \begin{cases} v_i^+ & s_i(t) > 0 \\ v_i^- & s_i(t) < 0 \end{cases} \qquad (12)$$

where, $k_w$ is a positive predetermind value which is a feedback gain to feed the wheel angular acceleration $\dot{x}_w$ back to the brake torque. $v_i^+$, $v_i^-$ are constants which satisfy the following conditions:

$$v_i^+ < f_{resisi} - (1+k_w) \cdot \eta \cdot \dot{x}_v(t) - f_{\mu i} \qquad (13)$$

$$v_i^- < f_{resisi} - (1+k_w) \cdot \eta \cdot \dot{x}_v(t) - f_{\mu i} \qquad (14)$$

Figure 10:
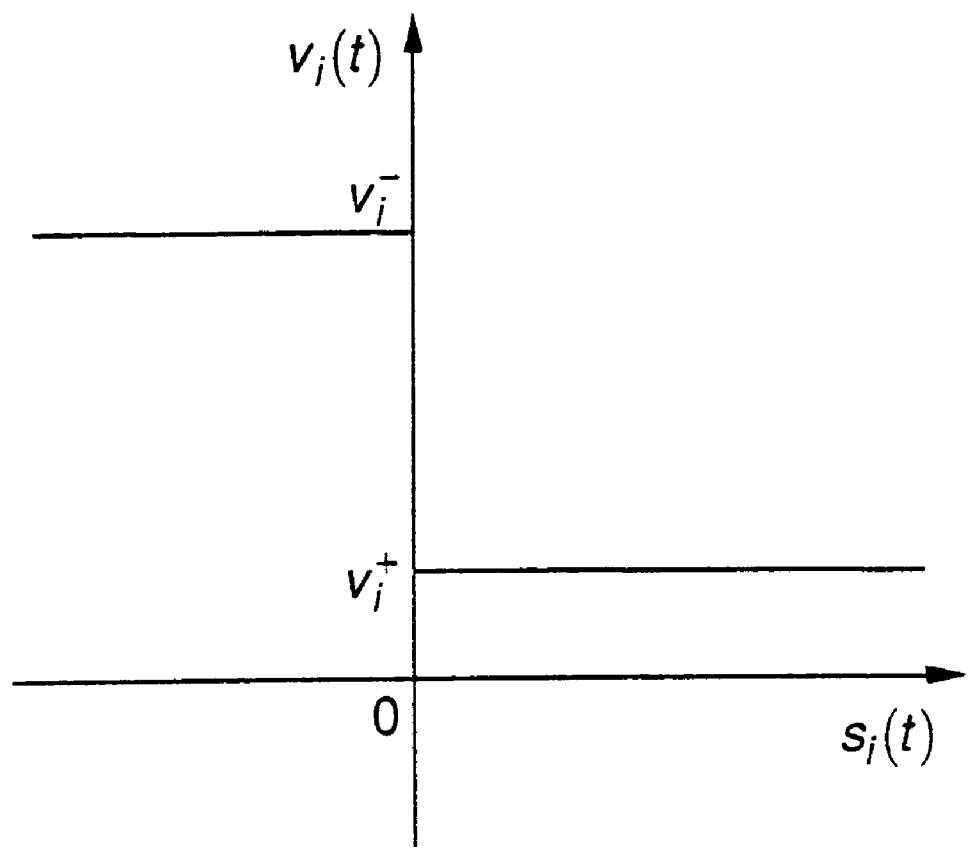
FIG. 10 is a graph showing the characteristics of a function $v_i(t)$ according to the third embodiment.

$f_{\mu i}$, $f_{resisti}$, $\dot{x}_v$, $s_i$ have limited values in all cases, so there are always values of $v_i^+$, $v_i^-$ satisfying equations (13) and (14). Expressing Equation (12) in diagrammatic form, the grapht of FIG. 10 is obtained.

In a step S15, the throttle opening is corrected and the generated torque is distributed to each drive wheel 10 via the torque distributor 2 as in the case of the first embodiment using the drive torque value $u_{cmdi}(t)$ calculated as described hereinabove.

According to this embodiment, Equation (10) of the aforesaid first embodiment is written as follows:

$$\dot{x}_{wi} = \frac{1}{1+k_w} \{f_{\mu i} - f_{resisi_i} + v_i(t)\} \qquad (16)$$

This is derived from the fact that if:

$$q_i = -k_w \cdot \dot{x}_{wi} + v_i$$

obtained from Equation (11) is substituted in Equation (9), $$\dot{s}_i(t) = \eta \cdot \dot{x}_v(t) + \dot{x}_{wi}(t) \qquad (15)$$

$$\dot{s}_i(t) = \eta \cdot \dot{x}_v(t) + \frac{1}{1+k_W} \cdot \{f_{\mu i} - f_{resisi_i} + v_i(t)\}$$

is obtained.

Substituting $v_i(t)$ of Equation (12) into Equation (15), it is easily seen that when $s_i(t)<0$, $\dot{s}_i(t)>0$ from equation (14), likewise when $s_i(t)>0$, $\dot{s}_i(t)<0$ from Equation (13). Hence, when this type of drive force change-over is possible, $V_i(t)$ decreases monotonously and $\lambda_i = \lambda_0$.

There is always a detection delay in wheel speed or vehicle speed with respect to the actual value. Further, when a digital processor is used as the computing device, control is performed at fixed intervals, so a control signal is not output between control times. There is also a delay in the actuator which generates the drive torque. Consequently, there is always a delay in the drive torque control.

For this reason, the slip ratio becomes too large or too small compared to the target value, the drive torque fluctuates, and as a result there is oscillation of the slip ratio in the region of the target values.

According to this embodiment, the angular acceleration $\dot{x}_w$ of the drive wheels is fed back to the drive torque, the moment of inertia of wheel rotation increases by an equivalent amount, and variation of wheel speed relative to $f_{\mu i}$, $f_{resiti}$ and $v_i(t)$ is less. This is clear from the fact that the left-hand side of $\dot{x}_v$ is $1/(1+k_w)$ of its value when $k_w=0$, due to the positive predetermined value of $k_w$ in Equation (16).

Hence, when the slip ratio is in the vicinity of the target value, $\dot{x}_w$ does not vary so much even when a delay occurs in the appearance of $v_i(t)$, and oscillation is lessened.

The acceleration of the drive wheels may be substituted by a pseudo differential obtained by processing the rotation speed of the drive wheels with a high pass filter or band pass filter. Also according to this embodiment, the vehicle speed may be substituted by the wheel speed of the non-drive wheels 20. Still further, a wheel speed sensor 4 may be fitted to each of the drive wheels 10 as in the aforesaid second embodiment, a rotational speed sensor 22 may be fitted to the propeller shaft 21 of a vehicle having a differential gear 23, and the average value xwi of the drive wheel speed calculated from the rotation speed of the propeller shaft 21 so as to control only the throttle opening.

We claim:

1. A wheel drive torque controller comprising:
   a sensor for detecting a drive wheel speed of a drive wheel;

a sensor for detecting a vehicle speed;
a controller configured to:
calculate a drive wheel slip ratio from said drive wheel speed and said vehicle speed;
set a determining function which takes a positive value when said wheel slip ratio is less than a predetermined target value, and which takes a negative value when said wheel slip ratio is larger than said predetermined target value;
set a switching function comprising a time integral of said determining function; and
determine a drive torque target value according to the value of said switching function; and
a drive torque generating mechanism for generating a drive torque of said drive wheel corresponding to said drive torque target value.

2. A wheel drive torque controller as defined in claim 1, wherein said determining function, said switching function and said wheel slip ratio are respectively defined by the following Equations (A), (B), and (C):

$$\sigma(t) = \eta \cdot x_v(t) + x_w(t) \qquad \text{Equation (A)}$$

where
$\eta = \lambda_0 - 1$
$\sigma(t)$: determining function
$x_v(t)$: vehicle speed
$x_w(t)$: drive wheel speed
$\lambda_0$: target slip ratio $$s(t) = \sigma(t) + k_I \cdot \int_{t_0}^{t} \sigma(t) dt \qquad \text{Equation (B)}$$

where
s(t): switching function
$k_I$: constant $$\lambda = \frac{x_v(t) - x_w(t)}{x_v(t)} \qquad \text{Equation (C)}$$

where
$\lambda$: wheel slip ratio.

3. A wheel drive torque controller as defined in claim 1, wherein said drive torque target value is determined by the following Equation (D):

$$u_{cmd}(t) = J_w \cdot q(t) \qquad \text{Equation (D)}$$

where $$q(t): \begin{cases} q^+ & s(t) > \delta \\ f(s) & 0 \leq s(t) \leq \delta \\ q^- & s(t) < 0 \end{cases}$$

s(t): switching function
$J_w$, $q^+$, $q^-$, $\delta$: constants $u_{cmd}(t)$: drive torque target value
f(s): monotonic decreasing function, $f(0) = q^-$, $f(\delta) = q^+$.

4. A wheel drive torque controller comprising:
a sensor for detecting a drive wheel speed of a drive wheel;
a sensor for detecting a vehicle speed;
a sensor for detecting a wheel angular acceleration;
a controller configured to:
calculate a drive wheel slip ratio from said drive wheel speed and said vehicle speed;
set a switching function which takes a positive value when said wheel slip ratio is less than a predetermined target value, and which takes a negative value when said wheel slip ratio is larger than said predetermined target value;
determine a drive torque target value according to the value of said switching function; and
correct said drive torque target value by a correction value according to said wheel angular acceleration; and
a torque generating mechanism for generating a drive torque of said drive wheel corresponding to a corrected drive torque target value.

5. A wheel drive torque controller as defined in claim 4, wherein said switching function and said wheel slip ratio are respectively defined by the following Equations (E) and (F):

$$s(t) = \eta \cdot x_v(t) + x_w(t) \qquad \text{Equation (E)}$$

where
$\eta = \lambda_0 - 1$
s(t): switching function
$x_v(t)$: vehicle speed
$x_w(t)$: drive wheel speed
$\lambda_0$: target slip ratio $$\lambda = \frac{x_v(t) - x_w(t)}{x_v(t)} \qquad (F)$$

where
$\lambda$: wheel slip ratio.

6. A wheel drive torque controller as defined in claim 4, wherein said drive torque target value is determined by the following Equation (G):

$$u_{cmd}(t) = J_w \{v(t) + k_w \cdot \dot{x}_w\} \qquad \text{Equation (G)}$$

where $$v(t) = \begin{cases} v^+ & s(t) > 0 \\ v^- & s(t) < 0 \end{cases}$$

s(t): switching function
$J_w$, $v^+$, $v^-$, $k_w$: constants
$\dot{x}_w$: drive wheel angular acceleration
$u_{cmd}(t)$: drive torque target value.

* * * * *